Jan. 17, 1928. J. C. LEDBETTER Re. 16,852

GARMENT PRESS

2 Sheets-Sheet 1

Original Filed Oct. 27, 1923

Inventor
James C. Ledbetter

By Attorneys
Bobbett & Ledbetter

Jan. 17, 1928. J. C. LEDBETTER Re. 16,852
GARMENT PRESS
2 Sheets-Sheet 2
Original Filed Oct. 27, 1923
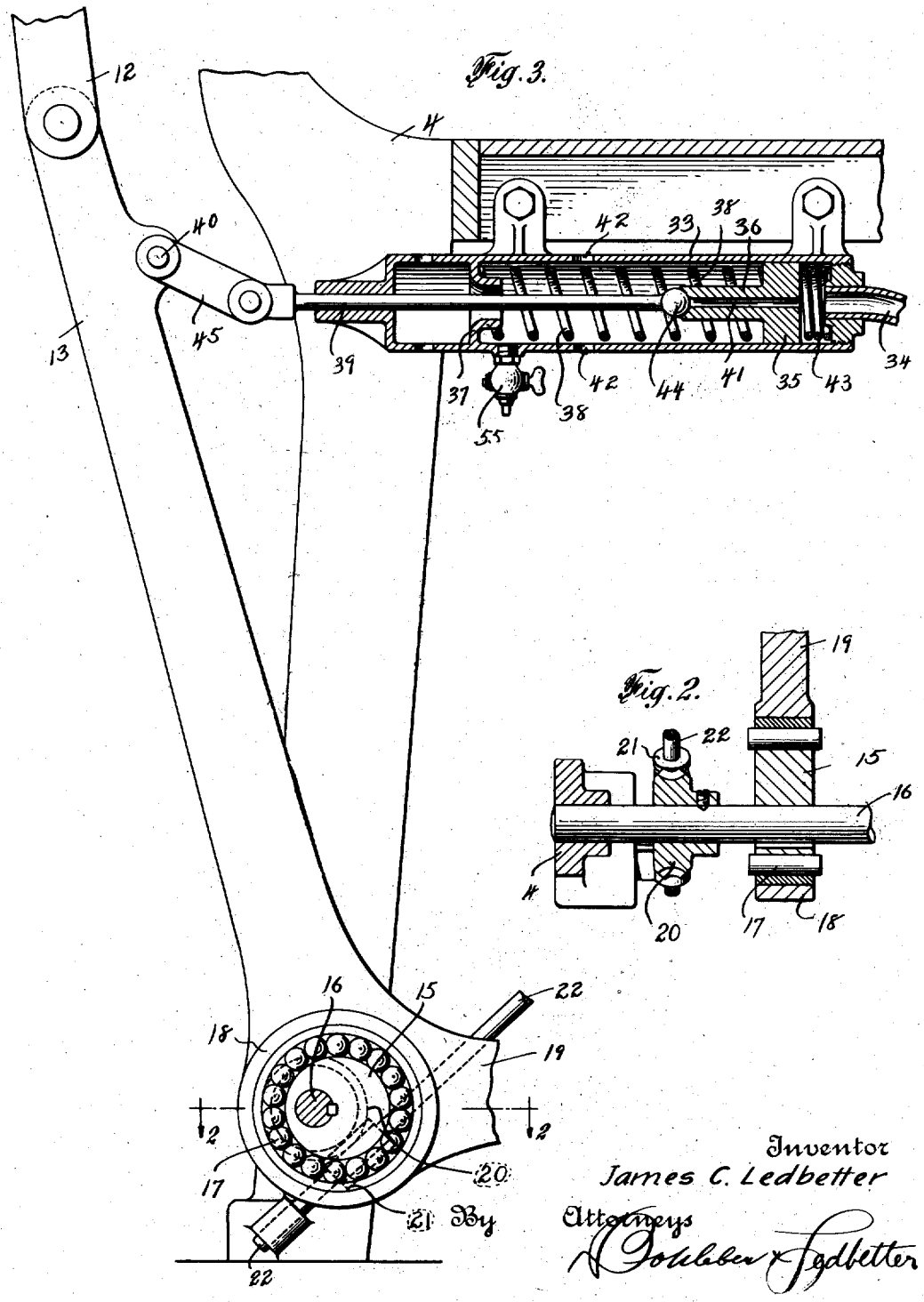

Reissued Jan. 17, 1928.

Re. 16,852

UNITED STATES PATENT OFFICE.

JAMES CAMROD LEDBETTER, OF NEW YORK, N. Y., ASSIGNOR, BY MESNE ASSIGNMENTS, TO THE PROSPERITY COMPANY, INC., A CORPORATION OF NEW YORK.

GARMENT PRESS.

Original No. 1,564,693, dated December 8, 1925, Serial No. 671,121, filed October 27, 1923. Application for reissue filed December 1, 1927. Serial No. 237,099.

This invention relates to pressing machines, and particularly to power pressing machines for garment pressing and laundry pressing work.

An object of the invention is to produce an improved garment pressing machine having high power pressing mechanism enabling a garment to be thoroughly treated and pressed with great pressure without strain on the operator's part.

A further object is to produce an improved combination pressing machine possessing both manual and power pressing mechanism, being a machine which is manually closed by the operator and which automatically turns on its power to produce final pressure without undue effort on the part of the operator, and which machine subsequently opens by power, thereby rendering unnecessary the use of counterweights or springs to lift the press head.

A further and important object is to provide an improved press adjustment means whereby the relative position of the press jaw members, and hence the degree of jaw compression, is conveniently placed under the control of the operator so he may regulate the pressure on the work, the adjustment means being placed at the front of the press and extending to and connecting with pressure regulating means included in the press operating mechanism which is remote from the operator.

In the accompanying drawings, Figure 1 illustrates the pressing machine in side elevation with the power operating mechanism thereof shown in section.

Figure 2 shows a sectional view on the line 2—2 of Figure 3 to illustrate one example of pressure regulating means used to vary the jaw compression on the work.

Figure 3 shows a detailed sectional view of a motor employed to open the press by power.

Figure 1:
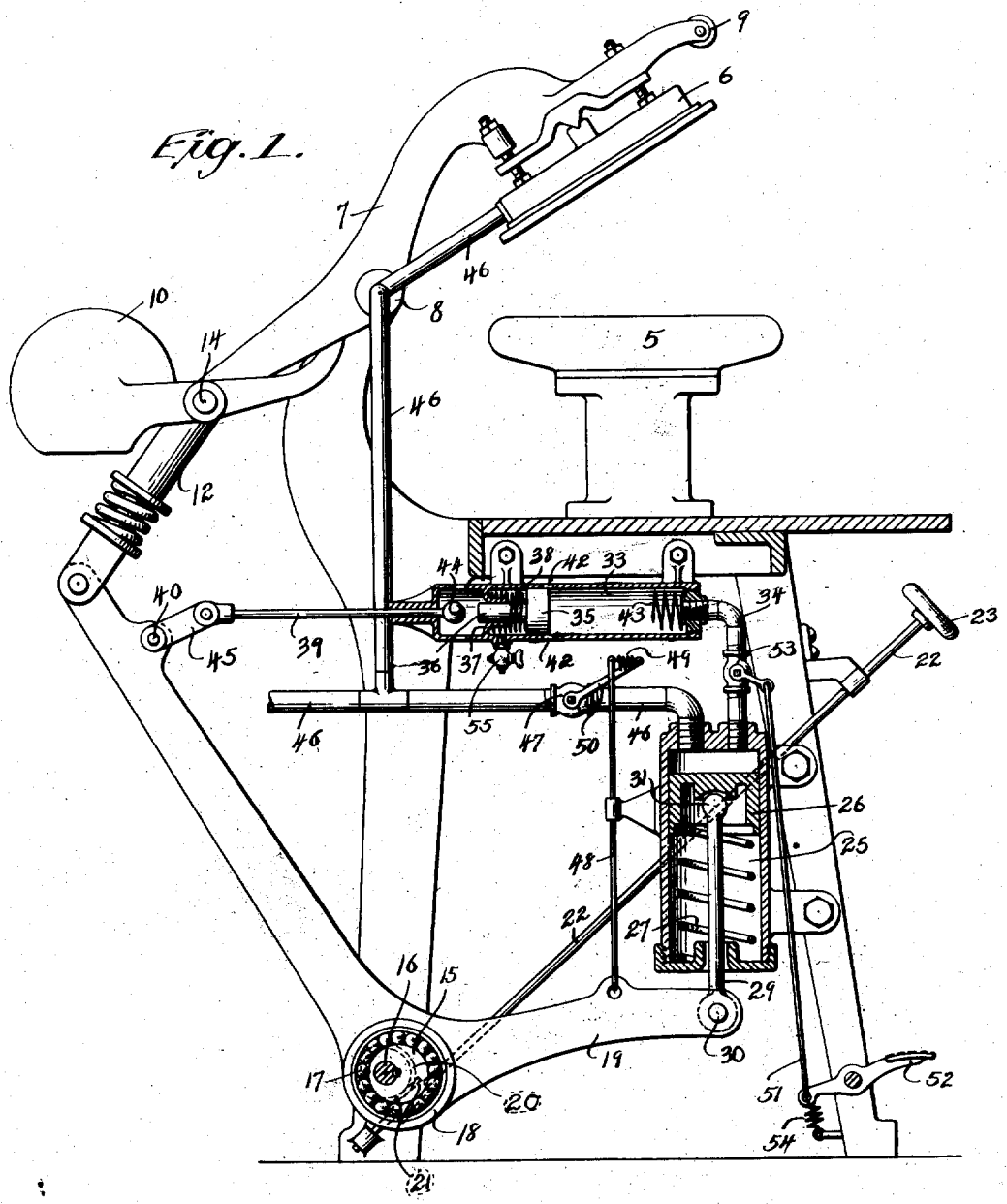

Referring now more particularly to the drawings for a detailed description of the invention, there is shown a pressing machine frame 4 of any suitable design and upon which may be mounted a press buck 5. A press head 6 is carried on the forward end of a press lever 7 which is pivoted at 8 on the frame 4; and it is observed how the press jaws or head 6 and buck 5 provide cooperating press members or jaws which open and close in movable relation for the purpose of pressing garments. Suitable steam-heating and steam-spraying means may be provided for either or both said press members 5 and 6 for treating the garments. A hand-hold piece, or handle 9, is provided by which the operator manually closes the head 6 down upon the buck 5.

The press lever 7 may be provided on the rear end thereof with a counterweight 10 which balances the press head 6 thereby preferably causing the press lever 7 to stand poised at any particular place, which enables the operator to quickly close the head 6 down upon the buck 5. This particular construction and mode of operation constituting a part of my invention enables a pressing machine of this character to be produced without necessarily employing springs or over-balancing weights to lift the head 6 or open the press after the pressing operation is completed, and thus I have described the preferred construction as being so arranged that the counterweight 10 and head 6 substantially balance one with the other.

A main operating toggle constituting pivotally joined links 12 and 13 is pivoted at its upper end at 14 to the press lever 7 and at its lower end upon eccentric means such as a cam 15 supported in the frame. The cam is fixed to a shaft 16, roller bearing 17 being interposed between cam 15 and hub 18 made a part of the lower toggle link 13. A power arm 19 is integral with the toggle link 13 and projects forwardly from the hub 18; and the toggle link 13 and arm 19 constitute a power operated bell crank swingable on the cam as a pivot.

The shaft 16 has a worm wheel 20 fixed thereto and a worm pinion 21 engages the wheel 20. A reach rod 22 provided with a hand wheel 23 is fixed to the worm 21, thereby enabling the operator standing at the front of the machine to rotate the worm 21, which shifts the cam eccentric element 15 up and down to vary or regulate the height of the toggle 12 and 13; and this movement adjustably varies the relative position of the pressing members or jaws 5 and 6 thereby rendering the machine most efficient in operation for the various kinds and thicknesses of garment pressing work. By turning the hand wheel 23, the cam 15 may be elevated or rotated in either direction to bring the cam up to its higher or lower position to adapt the press to thinner or thicker garments.

A power cylinder 25 is mounted over the forward end of the power arm 19 and may be anchored to the frame 4; and the cylinder carries therein a freely floating unattached piston 26. A substantially soft coil compression spring 27 is interposed between the piston and lower end of the cylinder and functions to return the piston 26 to its uppermost position. A push rod 29 is pivoted at 30 to the power arm and has a contact head 31 which is engaged by the piston 26 when the machine is operating under power. The piston 26 is usually held in a position slightly above the push rod head, for in designing this pressing machine improvement I have so constructed it that the manual operation involved in closing the head 6 down upon the buck is carried out without moving the pistons in the one or more cylinders employed, the object thereof being to reduce friction of moving parts, thereby rendering the pressing machine more easily closed. The lower end of the cylinder 25 is provided with an open head which permits the push rod 29 to freely move up and down in the cylinder when the operator manually closes the press by pulling downwardly on the handle 9.

A power press opening cylinder or motor 33 is connected with a pipe 34 to the upper end of the cylinder 25 whereby the steam employed to operate the motor 25—26 may be discharged or exhausted therefrom to the cylinder 33 for breaking the toggle and raising the head by force of the exhaust from the cylinder 25. The press head lifting motor 33 is fitted with a piston 35 which carries a valve stem 36 as an integral part thereof. The stem 36 works back and forth through a cylinder head 37 during the movement of the piston 35 in the cylinder 33.

A soft coil spring 38 is confined between the piston 35 and cylinder head 37 for the purpose of returning the piston 35 to its normal position near the forward end of the cylinder 33 to save the operator moving the piston during the manual closing stroke; and after the press head has been lifted to its uppermost position by the action of the piston 35, the spring 38 returns it to the other end of the cylinder 33. The motor 33 is fitted with a connecting rod in the nature of a push rod 39 and pivotal connecting link 45 which has one end pivotally connected at 40 to the toggle 12—13 and the other end 44 rests in engagement with the outer end of the piston stem 36 of the piston 35 thereby closing and sealing a piston exhaust passage 41 without loss of steam pressure when the piston is pushing against the push rod 39 to lift the head 6.

However, after the piston 35 passes beyond certain provided auxiliary exhaust ports 42 in the cylinder, the pressure of steam acting on the piston is dissipated sufficiently to permit the spring 38 to react forwardly on the piston thereby moving the piston valve stem 36 away from the ball headed end 44 of the push rod 39 which uncovers the exhaust passage 41 and permits the piston to quickly return to the forward or right hand end of the cylinder 33; and so when it comes time to close the press, the piston 35 has already passed out of the way of all manually operating parts thus saving the operator's efforts, and permitting the push rod 39 to travel through the cylinder head 37 and approach the front end of the cylinder 33 where the ball valve 44 of the rod 39 takes up a position over the end of the valve stem 36 closing the exhaust passage 41 to again make ready for another power opening operation.

A cushion spring 43 is provided at the forward end of the cylinder 33 against which the piston 35 comes to rest in a manner designed to closely fit the push rod head 44 over the piston valve exhaust passage 41 when the pressing machine closes, and thus seal the exhaust 41 so that steam or air under pressure entering the motor 33 will positively act against the piston 35 to force the same rearwardly to actuate the push rod 39 to break the toggle 12—13 to open the press jaws. The push rod head 44 performs the double function of sealing the passage 41 and taking the thrust of the piston 35, and the head 44 passes freely through a central opening made in the cylinder head 37. It is to be appreciated that this press is manually closed by the operator only, and no pressing is actually done by him, for by the time the push rod 39 and piston 35 reach the spring cushion 43, the power cylinder 25 will have been automatically turned on to perform the real work of pressing as will be described.

A steam or air pressure supply main 46 not only supplies steam to the pressing jaw members 5 and 6 but conveys steam to the cylinder 25 as well; and a valve 47 cuts off and turns on the steam to operate the motor 25—26. The operation of the valve 47 is automatically accomplished through the agency of a control rod 48 pivotally connected at its lower end to the power arm 19. The upper end of the rod 48 connects through a pull spring 49 with a valve handle 50 designed to operate the valve 47 with a quick snap closed and snap opened action when the power arm is manually worked up and down, respectively. A power control opening pedal 52 is pivoted on the frame and connects with an exhaust valve 53, included in the exhaust pipe 34, and this pedal controls the press opening action. A spring 54 holds the valve 53 normally closed and the pedal 52 up. A link 51 or other suitable means connects the pedal 52 and exhaust valve 53 by which the latter is opened by the operator to exhaust the pressure from the cylinder 25.

In operation, the press jaws are closed by hand power onto the garment spread upon the buck, and by the time the head and buck are in contact, the pull spring 49 is under sufficient tension to quickly open the valve 47 which permits steam to flow to the cylinder 25 and drive the piston 26 down to overtake the push rod 29 which action automatically completes the operation of straightening the toggle 12—13 to produce extreme head and buck pressure. At the same time this movement of parts occurs, the other push rod 39 takes up a position in contact with the valve stem 36 as hereinbefore described and as shown in Figure 3. Having pressed, steamed, and dried the garment on the buck, the operator now depresses the pedal 52 which discharges the pressure from the cylinder 25 into the cylinder 33 thereby quickly opening the press by the power of the exhaust from the power cylinder and lifting the head without springs or weights or manual effort.

In order to avoid undue slamming of parts or too quickly opening the press, the power opening motor 33—35 is provided with an air cushion dashpot in effect already described. This dashpot consists of the cylinder head 37, together with the piston 35 and valve stem 36 which produces an air lock between the parts 37 and 35 when the piston valve stem 36 moves into sliding fit with the head 37, thus confining air therebetween under pressure which increases rapidly until the movement of parts is stopped against the air cushion. At this time the ports 42 are uncovered to vent both cylinders 25 and 33 which permits both pistons to move away from the push rods to the upper and front ends of the cylinders freeing the press of any piston or cylinder connections and thus setting the machine for the next operation. A dashpot regulating valve 55 is placed in the dashpot end of the motor 33 for the purpose of regulating the escape of compressed air to quietly bring the head, press lever, and other parts to rest in press opened position.

It is desirable to make power presses operate manually as far as closing the press is concerned for if the closing stroke is executed by power, there is danger of an accident for the operator may by chance get his hands between the jaws of the press. This danger is always avoided when the operator is compelled to bring his hands up to the handle 9 to close the press. The closing operation is very easily accomplished for the press lever is balanced, and there exists minimum friction of moving parts.

The front control hand device 23 for adjusting the compression regulating eccentric means 15 affords an easily operated press because the jaw compression on the work can be quickly changed and tested and made more or less at the will of the operator without his moving about or going to the rear of the press and without finding it necessary to secure a wrench for making the adjustment. The design and construction of the mechanism is such that it turns easily from the handle 23.

It is seen that the press operating and pressure producing means 9, 7, 12—13, 19, 25—26 and other parts, include the movable member 13 operatively connected with a press jaw and said movable member 13 is pivotally carried on the eccentric pivot support means 15, and that the latter is shifted to a high or low position in the hub 18 by the regulating device shown here by way of example to comprise a rod and hand wheel 23 which easily turn from the front of the machine to move the eccentric 15 to a higher or lower position as desired.

In the example of press chosen to illustrate the principle of the invention, the eccentric means 15 is disposed at the rear lower part of the machine but this eccentric is reached by the rod 22 which is fitted on the lower end with suitable means to rotatably shift and adjust the eccentric 15 to finely vary the elevation of the movable member 13. However, the adjustable support 15 and movable member 13 carried thereon, may be disposed at any other convenient location in the press frame.

What I claim is:

1. A pressing machine comprising in combination, cooperating press members, means to close the press manually, means to produce final pressure by the application of motor means to the closed press, and power means for raising one press member high above the other from closed pressing position to fully opened position.

2. A pressing machine comprising in combination, cooperating press members, means to close the press manually, means to produce final pressure by the application of motor means to the closed press, power means for raising one press member high above the other from closed pressing position to fully opened position, and a dashpot cushion to retard the opening movement of the press member.

3. A pressing machine comprising in combination, cooperating press members, means to close the press manually, means to produce final pressure by the application of motor means to the closed press, power means for raising one press member high above the other from closed pressing position to fully opened position, and a dashpot cushion made an integral part of the power press opening means.

4. A pressing machine comprising in combination, cooperating press members, means to close the press manually, means to produce final pressure by the application of motor means to the closed press, power means for raising one press member high above the other from closed pressing position to fully opened position, and a hand wheel regulating device for varying the cooperative relative pressing position of the press members.

5. A pressing machine comprising in combination, cooperating press members, means to close the press manually, means to produce final pressure by the application of motor means to the closed press, power means for raising one press member high above the other from closed pressing position to fully opened position, a toggle connected with the said one press member being raised, a cam pivot bearing supporting the toggle, and a hand regulating device to adjustably rotate the cam.

6. A pressing machine comprising in combination, cooperating press members, means to close the press manually, means to produce final pressure by the application of motor means to the closed press, power means for raising one press member high above the other from closed pressing position to fully opened position, a press lever carrying one of the members, said manually closing means constituting a handle carried on one of the press members, and a counterbalance weight carried on the press lever to balance the operable press member.

7. A pressing machine comprising in combination, a frame, a bell crank pivoted therein, a press lever operated by one end of the bell crank, cooperating press members operable to open and close by the action of the press lever, a power cylinder connected to the other end of the bell crank to close the press members, and motor means driven by the exhaust of the power cylinder to rock the bell crank to open the press.

8. A pressing machine comprising in combination, a frame, a bell crank pivoted therein, a press lever operated by one end of the bell crank, cooperating press members operable to open and close by the action of the press lever, a power cylinder connected to the other end of the bell crank to operate the press members, motor means driven by the exhaust of the power cylinder to rock the bell crank to open the press, an adjustable pivot supporting the bell crank, and means operable from the front of the machine for adjusting the pivot to vary the closing pressure of the press members.

9. A pressing machine comprising in combination, a frame, a press lever pivoted therein, cooperating press members operable by the lever to open and close the press, a toggle connected to the press member, a power arm fixed to the toggle, manually closing press means, a power pressure motor connected to the power arm, means to automatically turn on the power motor at the end of the manually closing operation, a motor arranged to open the press by power, a manually operable means designed to control the motor, and means to automatically cut off the power motor when the press opening motor begins to act.

10. A pressing machine comprising in combination, a frame, a press lever pivoted therein, cooperating press members operable by the lever to open and close the press, a toggle connected to the press member, a power arm fixed to the toggle, manually closing press means, a power pressure motor connected to the power arm, means to automatically turn on the power motor at the end of the manual closing operation, a motor arranged to open the press by power, a manually operable means designed to control the motor, means to automatically cut off the power motor when the press opening motor begins to act, a dashpot embodying a cylinder, a piston reciprocable in the cylinder, and means for returning the piston to rest at one end of the cylinder without disturbing the closed position of the press members.

11. A pressing machine comprising in combination, cooperative opening and closing press members, power cylinders connected with the press members, fluid supply means running to one cylinder to produce extreme pressure, an exhaust connection extending from the cylinder producing extreme pressure to the other cylinder which acts to open the press by power, and manual press closing means.

12. A pressing machine comprising in combination, cooperative opening and closing press members, power cylinders connected with the press members, fluid supply means running to one cylinder to produce extreme pressure, an exhaust connection extending from the cylinder producing extreme pressure to the other cylinder which acts to open the press by power, manual press closing means which governs the fluid supply means, and manual control means controlling the operation of the exhaust connection.

13. A garment press comprising in combination cooperating press members, a power cylinder, a piston freely floating therein, a push rod engaging the piston and connecting with the members to produce pressure, and means acting on the piston to return it to normal inactive position after producing final pressure.

14. A garment press comprising in combination cooperating press members, a power cylinder, a piston freely floating therein, a push rod engaging the piston and connecting with the members to produce pressure, means acting on the piston to return it to normal inactive position after producing final pressure, and another cylinder connected with the press members adapted to open the press.

15. A garment press comprising in combination cooperating press members, a power cylinder, a piston freely floating therein, a push rod engaging the piston and connecting with the members to produce pressure, means acting on the piston to return it to normal inactive position after producing final pressure, another cylinder connected with the press members adapted to open the press, and a connection existing between the two cylinders enabling the exhaust of one cylinder to operate the other cylinder.

16. A garment press comprising in combination cooperating press members, a power cylinder, a piston freely floating therein, a push rod engaging the piston and connecting with the members to produce pressure, means acting on the piston to return it to normal inactive position after producing final pressure, another cylinder connected with the press members adapted to open the press, a connection existing between the two cylinders enabling the exhaust of one cylinder to operate the other cylinder, and manual control means adapted to open and close the said connection.

17. A garment pressing machine comprising in combination, pressing members designed to open and close one against the other, a hand operated means designed for safely closing the press, a power cylinder, a piston freely floating therein, a push connecting rod extending from the piston to one pressing member adapted to produce high pressure, a lost motion connection provided between the piston and pressing members whereby the piston pushes through the cylinder to produce high pressure and then returns to normal inactive position.

18. A garment pressing machine comprising in combination, pressing members designed to open and close one against the other, a hand operated means designed for safely closing the press, a power cylinder, a piston freely floating therein, a push connecting rod extending from the piston to one pressing member adapted to produce high pressure, a lost motion connection provided between the piston and pressing members whereby the piston pushes through the cylinder to produce high pressure and then returns to normal inactive position, and a power press opening means operable from the cylinder.

19. A garment pressing machine comprising in combination, pressing members designed to open and close one against the other, a hand operated means designed for safely closing the press, a power cylinder, a piston freely floating therein, a push connecting rod extending from the piston to one pressing member adapted to produce high pressure, a lost motion connection provided between the piston and pressing members whereby the piston pushes through the cylinder to produce high pressure and then returns to normal inactive position, a power press opening means operable from the cylinder and comprising a cylinder and piston motor, a venting valve in the press opening means, and means causing the piston to return to normal position after the venting means has acted.

20. A garment pressing machine comprising in combination, pressing members designed to open and close one against the other, a hand operated means adapted to safely close the press, motor means adapted to act on the closed press to produce final pressure, a power press opening means connected with the pressing members, and a dashpot adapted to bring the moving parts quietly to rest.

21. A garment pressing machine comprising in combination, pressing members designed to open and close one against the other, a hand operated means adapted for safely closing the press, motor means adapted to act on the closed press to produce final pressure, a power press opening means connected with the members, a dashpot adapted to bring the moving parts quietly to rest, and means related with the press opening means to return said means to normal position immediately after the press has opened.

22. A pressing machine comprising in combination co-operating pressing members, a toggle having one end thereof pivotally attached to one of the pressing members, an adjustable pivot supporting the other end of the toggle, means reaching from the adjustable pivot upwardly to a position convenient to an operator whereby the height of the toggle may be regulated to vary the pressure between the pressing members, and means for operating the toggle.

23. A pressing machine comprising in combination cooperating pressing members, a toggle having one end thereof pivotally attached to one of the pressing members, an adjustable pivot supporting the other end of the toggle, means reaching from the adjustable pivot upwardly to a position convenient to an operator whereby the height of the toggle may be regulated to vary the pressure between the pressing members, and manual means for closing the press and operating the toggle.

24. A pressing machine comprising in combination, cooperating pressing members, a toggle employed to open and close the press, a cam pivot related with the toggle, means connected with the cam pivot for rotating the cam to alter the position of the toggle to vary the pressure between the pressing members, a reach rod extending from the means to the front of the pressing machine, means on the end of the reach rod for rotating said rod, and toggle operating means.

25. A pressing machine comprising in combination, a frame, cooperating pressing members carried thereby, a cam pivot rotatably carried on the frame, a press closing mechanism supported on the cam pivot and connected with a pressing member, a worm wheel and pinion connected with the cam, and a reach rod extending from the worm and pinion to the operator's position.

26. A press comprising a frame, press jaws, and operating means to actuate a jaw to open and close the press and to produce compression between the jaws; said operating means including a downwardly directed movable member operatively connected to one of the jaws, a pivot carried in the lower part of the frame and on which the movable member is supported, eccentric means cooperating with the pivot to shift and adjust the position of the movable member in relation to the frame, and a control device operatively connected with the eccentric means and extending to the upper part of the frame and to a point adjacent to an operator for his manipulation to vary the position of the eccentric means to regulate the jaw compression.

27. A press comprising a frame, press jaws supported on the upper part of the frame, and operating means to open and close the jaws and to produce jaw compression; means to regulate the jaw compression comprising, a pivot carried in the lower rear portion of the frame on which an element of the operating means is movably carried, eccentric means cooperating with the pivot to shift said pivot and adjust the position of the movable element in relation to the frame, and a regulating device operatively connected at its lower end to the eccentric means and extending upwardly and forwardly at an angle to the frame where on its upper end it carries a handle convenient to an operator.

28. A press comprising a frame, press jaws carried on the upper frame portion, and operating means including a vertically swingable member operatively connected to one of the jaws to open and close the press and to produce jaw compression; means to regulate the jaw compression comprising, a pivot carried in the lower rear part of the frame beneath the press jaws and on which the vertically swingable member is movably supported, adjustment means cooperating with the pivot by which the latter is moved in relation to the frame to correspondingly move said swingable member to vary the jaw compression, and a regulating device operatively connected at its lower end to the adjustment means and extending upwardly to the front side of the frame convenient to an operator.

29. A press comprising, a frame, press jaws carried on the upper part thereof, and operating means to open and close the jaws and to produce jaw compression; means to vary the jaw compression by displacement of the operating means in relation to the frame comprising, an eccentrically mounted pivot carried in the lower part of the frame and on which a part of the operating means aforesaid is carried, a reach rod having a handle mounted in a position proximate the jaws and extending downwardly to the pivot, and means operatively connecting the lower end of the reach rod to the pivot by which the eccentric mounting of the pivot is actuated to adjust the degree of jaw compression.

30. A press comprising, a frame, press jaws carried on the upper part thereof, and operating means movable in the frame to open and close the press and to produce jaw compression; means to regulate the jaw compression comprising, a pivot carried in the frame and including eccentric means on which is movably carried a member of the aforesaid operating means, a worm wheel connected to the eccentric means to rotate the same, a worm meshing with the worm wheel, a reach rod connected with the worm to rotate it and extending upwardly to the front of the press to a point convenient to an operator and having a handle on its upper end for manual operation.

31. A press comprising a frame, press jaws carried thereby; and operating means including, an upstanding member operatively connected at its upper end to one of the jaws, to open and close the jaws and to produce jaw compression; means to regulate the jaw compression comprising, a pivot carried in the lower part of the frame on which the lower end of the upstanding member is supported, and adjustment means to move the pivot in the frame, and a reach rod operatively connected with the adjustment means and extending upwardly to a position convenient to an operator for his manipulation to regulate the compression.

32. A press comprising a frame, press jaws carried thereby; and operating means including, an upstanding member operatively connected at its upper end to one of the jaws, to open and close the press and to produce jaw compression; means to regulate the jaw compression comprising, an eccentric carried in the lower part of the frame on which the lower end of the upstanding member is supported, and a rod having a handle on the upper end thereof adjacent to an operator and operatively connected at its lower end to the eccentric to rotate the same to vary the compression.

In testimony whereof I have signed this specification.

JAMES CAMROD LEDBETTER.